(12) United States Patent
Lee

(10) Patent No.: US 10,939,275 B2
(45) Date of Patent: Mar. 2, 2021

(54) METHOD OF PROVIDING CONNECTIVITY NAVIGATION AND NAVIGATION SYSTEM USING THE SAME

(71) Applicants: HYUNDAI MOTOR COMPANY, Seoul (KR); KIA MOTORS CORPORATION, Seoul (KR)

(72) Inventor: Hwang Jik Lee, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/567,654

(22) Filed: Sep. 11, 2019

(65) Prior Publication Data
US 2020/0329361 A1  Oct. 15, 2020

(30) Foreign Application Priority Data
Apr. 9, 2019 (KR) .................. 10-2019-0041404

(51) Int. Cl.
| H04W 24/00 | (2009.01) |
| H04W 8/00 | (2009.01) |
| H04W 4/024 | (2018.01) |
| H04W 4/48 | (2018.01) |
| G01S 19/48 | (2010.01) |
| H04W 4/20 | (2018.01) |
| G01C 21/26 | (2006.01) |

(52) U.S. Cl.
CPC ............ *H04W 8/005* (2013.01); *G01S 19/48* (2013.01); *H04W 4/024* (2018.02); *H04W 4/20* (2013.01); *H04W 4/48* (2018.02); *G01C 21/26* (2013.01)

(58) Field of Classification Search
CPC ....... H04W 64/00; H04W 4/02; H04W 84/18; H04W 88/06; H04W 76/02; H04M 1/7253; H04M 2250/02
USPC ............ 455/456.1, 456.2, 456.3, 456.6, 41.2
See application file for complete search history.

(56) References Cited

U.S. PATENT DOCUMENTS

| 2016/0069697 A1* | 3/2016 | Oel | G01C 21/3476 701/426 |
| 2016/0146616 A1* | 5/2016 | Ren | G01C 21/165 701/409 |
| 2019/0054874 A1* | 2/2019 | Breed | B60N 2/0244 |
| 2019/0107406 A1* | 4/2019 | Cox | G01C 21/3492 |
| 2020/0057783 A1* | 2/2020 | Ricci | B60R 25/00 |
| 2020/0059752 A1* | 2/2020 | Marko | H04W 4/029 |

* cited by examiner

*Primary Examiner* — Temica M Beamer
(74) *Attorney, Agent, or Firm* — Brinks Gilson & Lione

(57) ABSTRACT

A method of providing connectivity navigation with a head unit in a navigation system includes the steps of determining a reception state of global positioning system (GPS) information, searching for at least one device connected by wire or wirelessly, receiving position sensor information from the searched devices, determining reliability of the position sensor information, and selecting information of a device having high reliability as received information based on the determined reliability. In addition, a navigation system including the head unit, a vehicle controller, a mobile terminal, and a telematics server performs the method of providing connectivity navigation.

13 Claims, 8 Drawing Sheets

<VEHICLE SENSOR INFORMATION>

| VARIOUS ENVIRONMENTS | VEHICLE GPS STATE |
|---|---|
| TRAVELING IN TUNNEL (INCLUDING CURVED TUNNEL) | GPS SHADOW |
| LARGE UNDERGROUND PARKING LOT (GPS SHADOW) | |
| TRAVELING ON MOUNTAIN (ON STEEP SLOPE AND AROUND SHARP TURN) | GPS EXCELLENT |
| TRAVELING STRAIGHT AT HIGH SPEED | |
| BUILDING CONCENTRATION AREA AND MULTIPATH AREA | GPS DISTORTION |
| TRAVELING ON UNDERPASS (TRAVELING ON STEEP SLOPE IN CITY) | GPS POOR |
| WOODLAND PATH | |
| SPIRAL RAMP AND GPS INTERMITTENT-RECEPTION PARKING LOT | |

<MOBILE TERMINAL SENSOR INFORMATION>

| VARIOUS ENVIRONMENTS | PHONE GPS STATE |
|---|---|
| CABIN OF VEHICLE | GPS SHADOW |
| ON DASHBOARD | GPS EXCELLENT |
| MIDDLE POSITION OF VEHICLE | GPS POOR |

- Prior Art -

FIG. 4

<POSITION INFORMATION>

| | POSITION SENSOR INFORMATION | CURRENT VEHICLE GPS | SMARTPHONE | | | CENTER GPS |
|---|---|---|---|---|---|---|
| | | | GPS | WIFI | BASE STATION | |
| RECEIVED GPS SIGNALS | AVAILABILITY VALUE | 0 | 1 | 1 | 1 | 1 |
| | ACTUAL VALUE (LATITUDE, LONGITUDE) | 1.12345, 8.12345 | 37.12345, 128.12345 | 37.12345, 128.12345 | 37.12345, 128.12345 | 37.12345, 128.12345 |
| | MEASUREMENT TIME | 2018.12.11 | 2018.12.11 | 1900.12.11 | 1900.12.11 | 1900.12.11 |
| | (CUMULATIVE) WEIGHT | 10 | 20 | 100 | 50 | 100 |

FIG. 6

<GPS SHADOW AREA>

| | POSITION SENSOR INFORMATION | CURRENT VEHICLE GPS | MOBILE TERMINAL | | | CENTER GPS |
| --- | --- | --- | --- | --- | --- | --- |
| | | | GPS | WIFI | BASE STATION | |
| RECEIVED GPS SIGNALS | AVAILABILITY | X | X | O | O | O |
| | ACTUAL VALUE (LATITUDE, LONGITUDE) | 0.0001, 8.12345 | 0.0001, 8.12345 | 37.12345, 128.12345 | 37.12345, 128.12345 | 37.12345, 128.12345 |
| | MEASUREMENT TIME | 2018.12.11 | 2018.12.11 | 1900.12.11 | 1900.12.11 | 1900.12.11 |

FIG. 7

<VEHICLE GPS IS GOOD AND TERMINAL GPS IS WEAK>

| | POSITION SENSOR INFORMATION | CURRENT VEHICLE GPS | MOBILE TERMINAL | | | CENTER GPS |
|---|---|---|---|---|---|---|
| | | | GPS | WIFI | BASE STATION | |
| RECEIVED GPS SIGNALS | AVAILABILITY | O | X | O | O | O |
| | ACTUAL VALUE (LATITUDE, LONGITUDE) | 37.12345, 128.12345 | 0.0001, 8.12345 | 37.12345, 128.12345 | 37.12345, 128.12345 | 37.12345, 128.12345 |
| | MEASUREMENT TIME | 1900.12.11 | 2018.12.11 | 1900.12.11 | 1900.12.11 | 1900.12.11 |

FIG. 8

<VEHICLE SENSOR INFORMATION>

| VARIOUS ENVIRONMENTS | VEHICLE GPS STATE |
|---|---|
| TRAVELING IN TUNNEL (INCLUDING CURVED TUNNEL) | GPS SHADOW |
| LARGE UNDERGROUND PARKING LOT (GPS SHADOW) | |
| TRAVELING ON MOUNTAIN (ON STEEP SLOPE AND AROUND SHARP TURN) | GPS EXCELLENT |
| TRAVELING STRAIGHT AT HIGH SPEED | |
| BUILDING CONCENTRATION AREA AND MULTIPATH AREA | GPS DISTORTION |
| TRAVELING ON UNDERPASS (TRAVELING ON STEEP SLOPE IN CITY) | GPS POOR |
| WOODLAND PATH | |
| SPIRAL RAMP AND GPS INTERMITTENT-RECEPTION PARKING LOT | |

<MOBILE TERMINAL SENSOR INFORMATION>

| VARIOUS ENVIRONMENTS | PHONE GPS STATE |
|---|---|
| CABIN OF VEHICLE | GPS SHADOW |
| ON DASHBOARD | GPS EXCELLENT |
| MIDDLE POSITION OF VEHICLE | GPS POOR |

METHOD OF PROVIDING CONNECTIVITY NAVIGATION AND NAVIGATION SYSTEM USING THE SAME

CROSS-REFERENCE TO RELATED APPLICATION

This application claims priority to and the benefit of Korean Application No. 10-2019-0041404, filed on Apr. 9, 2019, which is incorporated herein by reference in its entirety.

FIELD

The present disclosure relates to a method of providing connectivity navigation and a navigation system using the same.

BACKGROUND

The statements in this section merely provide background information related to the present disclosure and may not constitute prior art.

A vehicle navigation device displays the current position of a vehicle on a monitor. The navigation device provides a driver with a variety of navigation information desired for traveling, such as the traveling direction of the vehicle, a distance to a destination, a current traveling speed of the vehicle, a route set by the driver before traveling, an optimal route to the destination, etc.

FIG. 1 is a view showing a general navigation system.

The general connectivity navigation technology of FIG. 1 means that a head unit 100 transmits information such as position information and speed information obtained using various sensors of a vehicle to a mobile terminal 300 through wired/wireless communication and the mobile terminal processes the information to provide services such as phone, music, route guidance and voice recognition. Through connection between devices, it is possible to share services such as navigation, music and phone.

However, since the general navigation system uses only the global positioning system (GPS) signal of the vehicle, the current position of the vehicle cannot be obtained in a GPS shadow area in which the GPS signal is not received, such as an underground parking lot. When a vehicle is moved to an area where the GPS signal can be received after being left in the GPS shadow area for a long time, it takes considerable time to calculate the current position of the vehicle due to initial GPS calibration. Accordingly, when only the GPS data is used for the navigation of the vehicle, malfunction may occur in the situation and area such as the GPS shadow area.

The above information disclosure in this Background section is only for enhancement of understanding of the background of the present disclosure, and therefore it may contain information that does not form the prior art that is already known to a person of ordinary skill in the art.

SUMMARY

The present disclosure provides a method of providing connectivity navigation and a navigation system using the same.

More specifically, the present disclosure may provide a method of providing connectivity navigation, which is capable of improving performance by searching for data of all sensors connected to a vehicle and selecting optimized sensor data having high accuracy according to characteristics of an area when sensor data in use becomes inaccurate or when the vehicle enters an area in which sensor data in use is determined to become inaccurate using position information.

In accordance with one form of the present disclosure, a method of providing connectivity navigation with a head unit in a navigation system includes the steps of determining a reception state of global positioning system (GPS) information, searching for at least one device connected by wire or wirelessly, receiving position sensor information from each of the searched device, determining reliability of the received position sensor information, and selecting information of one of the searched devices having high reliability as received information based on the determined reliability.

In accordance with a further form of the present disclosure, the method includes the steps of periodically requesting available position sensor information available from a vehicle controller, and receiving the position sensor information from the vehicle controller.

The searching for the at least one device connected by or wire or wirelessly further includes the step of determining whether connection with a mobile terminal is established through at least one of wired communication or short-range communication.

The receiving of the position sensor information from the searched devices includes the steps of requesting the position sensor information from the mobile terminal when connection with the mobile terminal is established by wire or wirelessly, and receiving the position sensor information from the mobile terminal.

In accordance with a further form of the present disclosure, the receiving of the position sensor information from the searched devices includes the steps of requesting pre-stored position information from a telematics server, and receiving the position information from the telematics server.

The position sensor information includes availability, an actual position value and a measurement time.

The determining of the reliability of the position sensor information includes the steps of comparing the actual position value according to the GPS information with the received position sensor information to determine the reliability, checking the availability of the received position sensor information, and calculating a weight of the position sensor information received from an available sensor.

The selecting the information of one of the searched devices having high reliability based on the determined reliability includes the step of selecting position sensor information of an available device in descending order in correspondence with a GPS reception state of at least one of a vehicle or a mobile terminal.

The method is executed by a computer-readable recording medium having recorded thereon a program.

In accordance with another form of the present disclosure, a navigation system for a vehicle includes a head unit mounted inside the vehicle, a vehicle controller configured to transmit and receive data to/from the head unit through controller area network (CAN) communication, a mobile terminal configured to transmit and receive data to/from the head unit using at least one of wired communication or short-range communication, and a telematics server configured to transmit and receive data to/from at least one of the head unit or the mobile terminal through a wireless Internet network. The head unit determines a reception state of global positioning system (GPS) information, searches for at least one device connected by wire or wirelessly, receives position sensor information from the searched devices, determines reliability of the position sensor information, and selects information of one of the searched devices having high reliability as received information based on the determined reliability.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a view showing GPS reliability data received by a navigation system according to a form of the present disclosure;

FIGS. 6 to 7 are views showing reliability data according to a GPS signal state received by a navigation system according to a form of the present disclosure; and FIG. 8 is a view showing a GPS signal state according to a vehicle traveling environment according to a form of the present disclosure.

Figure 1:
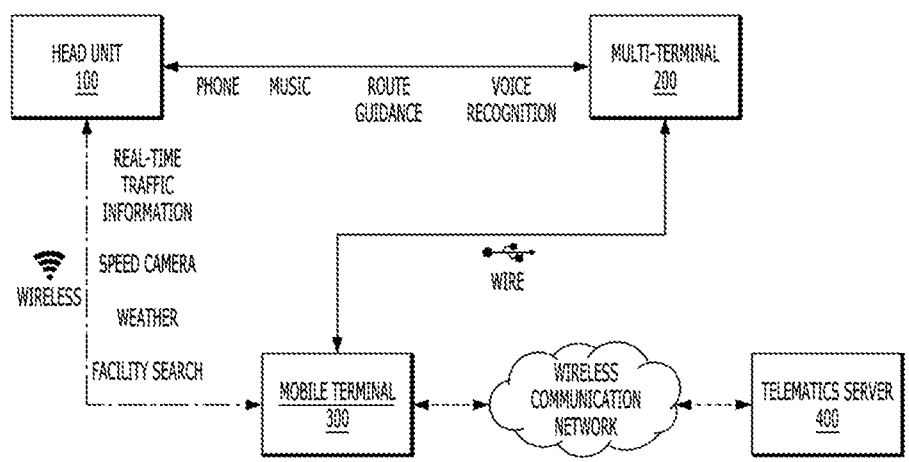
FIG. 1 is a view showing a general navigation system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The suffixes "module" and "unit" of elements herein are used for convenience of description and thus can be used interchangeably and do not have any distinguishable meanings or functions.

In the following description of the forms, it will be understood that, when each element is referred to as being formed "on" (above) or "under" (below) or "before" (ahead) or "after" (behind) the other element, it can be directly "on" (above) or "under" (below) or "before" (ahead) or "after" (behind) the other element or be indirectly formed with one or more intervening elements therebetween.

It will be understood that, although the terms first, second, A, B, (a), (b), etc. may be used herein to describe various elements of the present disclosure, these terms are only used to distinguish one element from another element and necessity, order, or sequence of corresponding elements are not limited by these terms. It will be understood that when one element is referred to as being "connected to", "coupled to", or "accessing" another element, one element may be "connected to", "coupled to", or "accessing" another element via a further element although one element may be directly connected to or directly access another element.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless obviously defined in the present disclosure, such terms are not interpreted as having ideal or excessively formal meanings.

Figure 2:
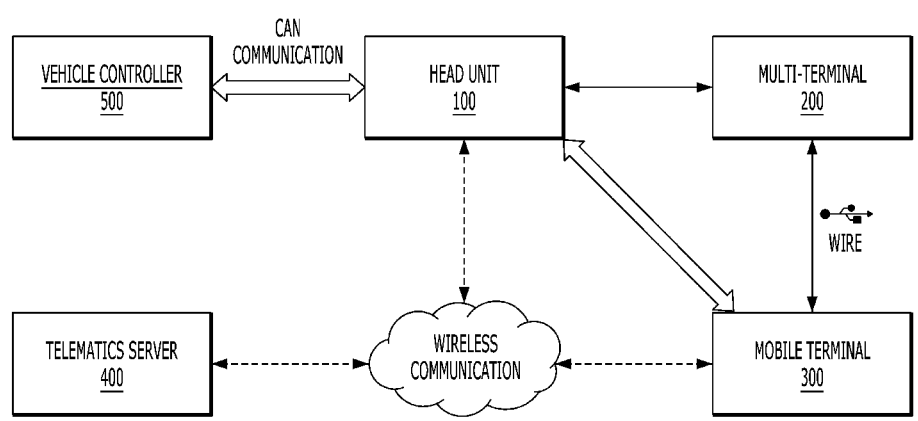
FIG. 2 is a view showing a navigation system according to a form of the present disclosure.

FIG. 2 is a view showing a navigation system according to a form of the present disclosure.

Referring to FIG. 2, the navigation system according to the present disclosure may include a head unit 100, a multi-terminal 200, a mobile terminal 300, a telematics server 400 and a vehicle controller 500.

The head unit 100 may be connected to an external device through a wired/wireless interface. At this time, the external device may include a smartphone, a communication tablet, a wearable device, etc. Such an external device may be referred to as a "mobile terminal".

The head unit 100 may include a wireless communication module. The module may be located inside or outside the head unit 100.

The head unit 100 may wirelessly exchange data with the mobile terminal 300. At this time, the head unit 100 and the mobile terminal 300 may exchange data through short-range wireless communication.

Examples of short-range wireless communication technology include at least one of Bluetooth™, NFC (Near Field Communication), RFID (Radio Frequency Identification), IrDA (Infrared Data Association), Wi-Fi (Wireless-Fidelity), Wi-Fi Direct, or Wireless USB (Wireless Universal Serial Bus). Data is transmitted and received according to at least one short-range wireless communication technology including short-range wireless communication technology not listed above.

The head unit 100 may wirelessly exchange data with the telematics server 400. Therefore, the head unit 100 is configured to transmit and receive wireless signals through a wireless communication network according to wireless Internet technologies.

Examples of wireless Internet technology may include WLAN (Wireless LAN), Wi-Fi (Wireless-Fidelity), Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), etc. Data is transmitted and received according to at least one wireless Internet technology including Internet technology not listed above.

The head unit 100 may request position information from the mobile terminal 300 connected by wire or wirelessly. To this end, the head unit 100 may receive available position sensor information from the mobile terminal 300. At this time, the position sensor information may include GPS (Global Positioning System) information, Wi-Fi information, etc.

The head unit 100 may exchange data with the vehicle controller using wired communication technology.

At this time, the head unit 100 may be connected to the vehicle controller through an internal interface such as CAN (Controller Area Network) communication and Ethernet communication, thereby establishing connection with unique sensors of the vehicle.

The head unit 100 may transmit and receive available position sensor information to and from the vehicle controller 500 connected by wire. To this end, the head unit 100 may periodically request the vehicle position sensor information. Thereafter, the vehicle controller 500 may receive the vehicle position sensor information generated in correspondence with the request for the vehicle position sensor information.

The head unit 100 may include a GPS (Global Positioning System) module or DGPS (Differential Global Positioning System) module to receive the position information of the vehicle.

The head unit 100 may determine the reception state of the GPS information.

The head unit 100 may search for a device connected by wire or wirelessly in correspondence with the received GPS information.

The head unit 100 may periodically request available position sensor information from the vehicle controller and receive the position sensor information from the vehicle controller.

In some forms, the head unit 100 may determine whether connection with the mobile terminal 300 is established through wired and short-range communication, request the position sensor information from the mobile terminal 300 when connection with the mobile terminal 300 is established by wire or wirelessly, and receive the position sensor information from the mobile terminal 300.

In some forms, the head unit 100 may request prestored position information from the telematics server 400 and receive the position information from the telematics server 400.

The head unit 100 may receive the position sensor information from the searched device. The position sensor information may include availability of the position information received from the sensor of the connected device, an actual position value, and a measurement time.

The head unit 100 may determine reliability of the position sensor information. To this end, the head unit 100 may determine availability of the received position sensor information and calculate a weight of the position sensor information received from the available sensor.

In some forms, the head unit 100 may compare the actual position value according to the GPS information with the received position sensor information to determine reliability. Reliability may be determined in real time and may be performed in a predetermined cycle, without being limited thereto.

The head unit 100 may select information of a device having high reliability as received information. The head unit 100 may select the position sensor information of the available device in descending order of reliability in correspondence with the GPS reception state of at least one of the vehicle or the mobile terminal 300.

In some forms, the head unit 100 may divide the vehicle GPS reception state into a GPS shadow state, an excellent state, a distortion state and a poor state, and may select best available position sensor information in descending order of reliability in each situation.

In some forms, the head unit 100 may divide the GPS reception state of the mobile terminal 300 into a GPS shadow state, an excellent state and a poor state and may select best available position sensor information in descending order of reliability in each situation.

The head unit 100 may determine the state of the GPS information received through the GPS module.

If GPS reception is difficult, the head unit 100 may periodically search at least one of the mobile terminal 300 or the vehicle controller 500 connected by wire or wirelessly for an available sensor.

The head unit 100 may determine accuracy of the received position information. To this end, the head unit 100 may obtain reliability data of each position indicating which device has accurate data in a certain situation through comparison between an actual result and the position information of the vehicle GPS and the mobile terminal 300.

The head unit 100 may include one or more microprocessors operating by a set program, and the set program may include a series of commands for performing steps included in the connectivity navigation method according to one form of the present disclosure.

The multi-terminal 200 may be a wired/wireless interface and may serve as an interface with various types of external devices connected to the vehicle. For example, the multi-terminal 200 may include a port connectable to the mobile terminal 300 and may be connected to the mobile terminal 300 through the port. Accordingly, the multi-terminal 200 may exchange data with the mobile terminal 300.

The mobile terminal 300 may be an external device for performing wireless communication with at least one of the vehicle or the telematics server 400.

The mobile terminal 300 may exchange data through short-range wireless communication or Internet communication using a wireless communication network.

For example, the mobile terminal 300 may exchange information of various sensors disposed therein with the outside. The position sensor information of the mobile terminal 300 may include GPS information, Wi-Fi information, etc.

The telematics server 400 may transmit and receive data to and from the vehicle and the mobile terminal 300 through a wireless Internet network. The telematics server 400 may provide real-time traffic information, speed camera information, facility search information and a weather information service to the connected device.

The vehicle controller 500 may transmit vehicle sensor information to the head unit 100. The vehicle position sensor information may be data received from the GPS module, an LTE modem, an ADAS sensor, etc. disposed in the vehicle.

The vehicle controller 500 may transmit and receive data to and from the head unit 100 through CAN communication and Ethernet communication.

Figure 3:
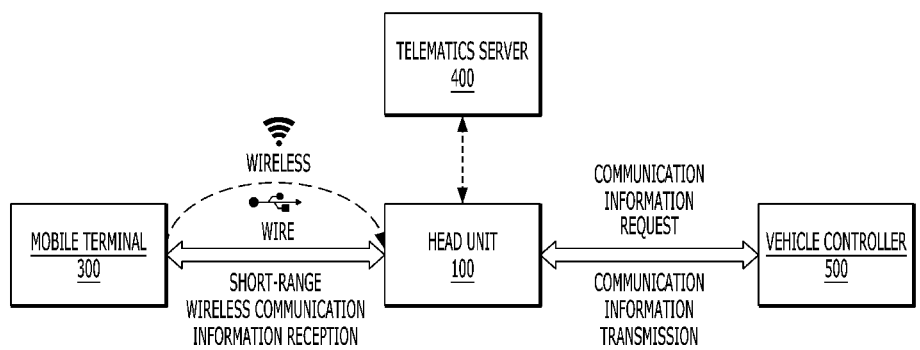
FIG. 3 is a view showing a navigation system using position sensor information according to a form of the present disclosure.

FIG. 3 is a view showing a navigation system using position sensor information according to a form of the present disclosure.

Referring to FIG. 3, the head unit 100 may check reliability of data immediately after the vehicle starts or periodically through the connected GPS module.

If reliability of the received data is low and thus the current position of the vehicle cannot be found, the head unit 100 may search for the sensor in the connected mobile terminal 300 and the vehicle controller 500.

The head unit 100 may check a GPS reception state of the received vehicle position sensor information.

The head unit 100 may confirm that GPS reception is difficult and periodically request communication information from the mobile terminal 300 connected by wire and wirelessly and the vehicle controller 500. In addition, the head unit 100 may request last stored position information through the connected telematics server 400.

The head unit 100 may determine reliability of the requested position sensor information and the last stored position information. That is, the head unit 100 may determine reliability through a predetermined logic.

To this end, the head unit 100 may compare the received GPS signals of devices. The head unit 100 may determine accuracy of the data of each device according to the situation through the result of comparison and obtain reliability data of each position.

The head unit 100 may select information of a device with high reliability for each situation according to the result of determining reliability as the position sensor information.

Meanwhile, the head unit 100 may select optimized position sensor information having high accuracy according to characteristics of an area, when position sensor information in use becomes inaccurate or when the vehicle enters an area in which sensor data in use is determined to become inaccurate using vehicle position information.

FIG. 4 is a view showing GPS reliability data received by a navigation system according to a form of the present disclosure.

Referring to FIG. 4, the GPS signal of the position sensor information received by the head unit 100 is shown.

The position information received by the head unit 100 may include vehicle GPS information, the GPS information of the mobile terminal 300, Wi-Fi information, base station information of a wireless communication network, and GPS information stored in the telematics server 400.

At this time, the position sensor information may include an availability value, an actual position value, a measurement time, and a weight.

The availability value may be 0 or 1. If the availability value is 0, the weight of the data of the sensor is 0 and thus the data of the sensor may not be used. If the availability value is 1, the weight of the data of the sensor may be calculated.

The actual position value may indicate latitude and longitude. The measurement time may indicate a time when the position information is input in units of year, month and day. The weight may indicate a cumulative usage count.

Figure 5:
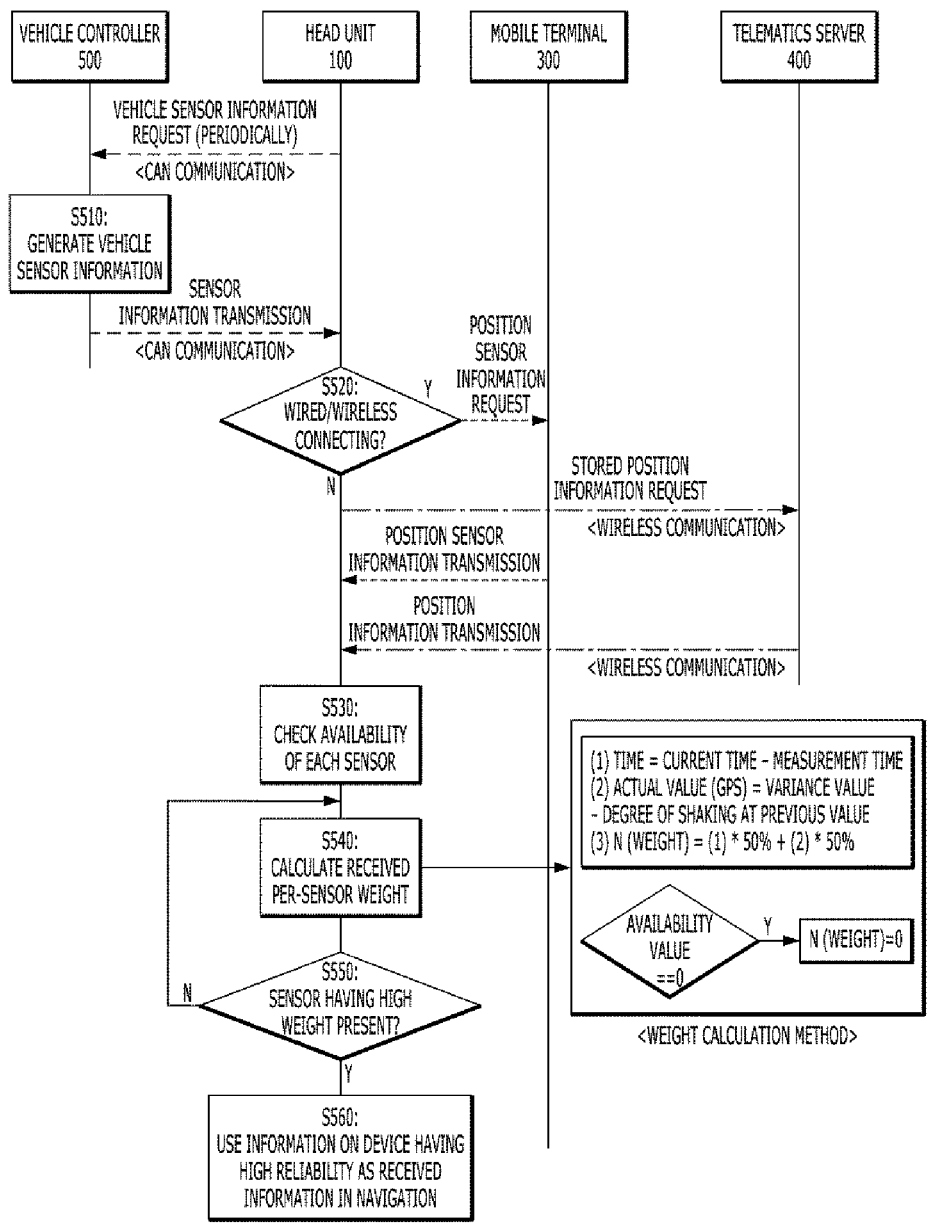
FIG. 5 is a flowchart illustrating a method of providing navigation using position sensor information according to a form of the present disclosure.

That is, the head unit 100 may select information of a device having high reliability for each situation as position information based on accuracy of data of each device. FIG. 5 is a flowchart illustrating a method of providing navigation using position sensor information according to a form of the present disclosure.

Referring to FIG. 5, the head unit 100 may request vehicle sensor information from the vehicle controller 500 through CAN communication in a predetermined cycle. The vehicle controller 500 may generate the vehicle position sensor information in correspondence with the request for the vehicle sensor information, and the head unit 100 may receive the vehicle position sensor information generated by the vehicle controller 500 through CAN communication (S510).

After step S510, the head unit 100 may determine whether at least one of wired connection or wireless connection with the mobile terminal 300 is established (S520).

After step S520, the head unit 100 may request the position sensor information of the mobile terminal 300 when at least one of wired connection or wireless connection with the mobile terminal 300 is established (Y of S520). The mobile terminal 300 may generate the position sensor information of the mobile terminal 300 in response to the request for the position sensor information, and the head unit 100 may receive the position sensor information of the mobile terminal 300 generated by the mobile terminal 300.

Meanwhile, when at least one of wired connection or wireless connection with the mobile terminal 300 is not established, the head unit 100 may request the position information from the telematics server 400 through a mobile communication network. The telematics server 400 may transmit prestored position information in response to the request for the position information (N of S520).

After step S520, the head unit 100 may check availability of each sensor (S530).

After step S530, the head unit 100 may calculate a received per-sensor weight (S540). In a method of calculating the per-sensor weight N, the weight N may be a sum of 50% of a time value and 50% of the actual position value (GPS). At this time, a time is obtained by subtracting a measurement time from a current time and the actual position value GPS may be obtained by subtracting a degree of shaking at a previous position value from a variance value. At this time, if the availability value is 0, the weight N may be 0.

After step S540, the head unit 100 may determine whether a sensor having a high weight N is present (S550).

After step S550, the head unit 100 may use information of the device having high reliability as position information when the sensor having the high weight N is present.

FIGS. 6 to 7 are views showing reliability data according to a GPS signal state received by a navigation system according to a form of the present disclosure.

Referring to FIG. 6, a first form shows available position sensor information when the vehicle is located in a GPS shadow area.

A navigation system according to the first form may determine that the vehicle is in the GPS shadow area and may use the position sensor information through Wi-Fi of the mobile terminal 300 and the base station in addition to the GPS signal. Accordingly, the navigation system may confirm and display the current position of the vehicle using Wi-Fi, the base station and the position sensor information.

Referring to FIG. 7, a second form shows the case where the vehicle is moved from the shadow area to a good reception area. At this time, the vehicle may compare the GPS information of the vehicle with the GPS signal of the mobile terminal 300 through a GPS signal checker (not shown).

In FIG. 7, the second form shows data of the state wherein the GPS of the vehicle is good and the GPS of the mobile terminal 300 is weak.

In the navigation system according to the second form, the GPS signal of the vehicle rapidly becomes good, but the GPS signal of the terminal becomes poor. In this case, the GPS information of the vehicle needs to be used, but it takes considerable time to perform GPS calibration. Accordingly, the navigation system may grasp the position of the vehicle using base station information and Wi-Fi information before the GPS information of the vehicle is stabilized. Thereafter, when the GPS data of the vehicle is stabilized, the position of the vehicle may be grasped using the GPS of the vehicle.

FIG. 8 is a view showing a GPS signal state according to a vehicle traveling environment according to a form of the present disclosure.

Referring to FIG. 8, the position sensor information received by the navigation system may be changed according to the vehicle traveling environment.

The navigation system may divide the GPS reception state into a GPS shadow area, an excellent area, a distortion area and a poor area according to the situation in which the vehicle travels, and select and use best available position sensor information in descending order of reliability in each situation.

For example, when the vehicle is traveling in a tunnel or is located in a large underground parking lot, the vehicle GPS reception state received from the sensor of the vehicle may be the GPS shadow state. At this time, traveling in the tunnel may include traveling in a curved tunnel. Since GPS reception is impossible in the tunnel, the current position cannot be calculated. However, it is possible to receive position sensor information with other options as described above.

For example, when the vehicle is traveling on a mountain or is traveling straight at a high speed, the vehicle GPS reception state received from the sensor of the vehicle may be the GPS excellent state. At this time, traveling on mountain may include traveling on a steep slope and traveling around a sharp turn.

For example, when the vehicle is traveling in a building concentration area and a multipath area, the vehicle GPS reception state received from the sensor of the vehicle may be the GPS distortion state. When it is assumed that tall buildings block the left or right side of the vehicle in an urban area, a satellite signal on the left or the right side reaches a shortest distance but the satellite signal on the opposite side is blocked and reflected by the building such that the signal may not be received. However, it is possible to receive position sensor information with other options as described above.

For example, if the vehicle is traveling on an underpass, a woodland path, a spiral ramp and a GPS intermittent-reception parking lot, the vehicle GPS reception state received from the sensor of the vehicle may be the GPS poor state. At this time, traveling on the underpass may include traveling on a steep slope in the city.

Accordingly, in an unstable environment in which normal GPS reception is difficult, such as traveling on an underpass, a GPS reception rate is significantly lowered and the current position may be incorrectly calculated at the GPS receiver. In this case, since the current position matches a backside road instead of a road on which the vehicle actually travels, route research may be continuously performed or the vehicle may be recognized as being on the overpass. However, it is possible to receive position sensor information with other options as described above.

Meanwhile, the navigation system may divide the GPS reception state of the mobile terminal 300 into the GPS shadow state, the excellent state and the poor state, and may select best available position sensor information in descending order of reliability in each situation.

For example, when the mobile terminal 300 is located in a cabin of the vehicle, the GPS reception state of the mobile terminal 300 received from the sensor of the mobile terminal 300 may be the GPS shadow state.

For example, when the mobile terminal 300 is located on the dashboard of the vehicle, the GPS reception state of the mobile terminal 300 received from the sensor of the mobile terminal 300 may be the GPS excellent state.

For example, when the mobile terminal 300 is located in a middle position of the vehicle, the GPS reception state of the mobile terminal 300 received from the sensor of the mobile terminal 300 may be the GPS poor state.

The method of providing connectivity navigation and a system therefor according to the present disclosure have the following effects.

First, it is easy to find a current position in an environment in which GPS reception is difficult.

Second, it is possible to reduce errors through a correction algorithm when errors occur in GPS performance.

Third, it is possible to reduce malfunction which may occur using only a vehicle GPS.

The method according to the form may be implemented as a program for execution on a computer and stored in a computer-readable recording medium. Examples of the computer-readable recording medium include a ROM, a RAM, a CD-ROM, a magnetic tape, a floppy disk, and an optical data storage.

The computer-readable recording medium can be distributed over a plurality of computer devices connected to a network so that computer-readable code is written thereto and executed therefrom in a decentralized manner. Functional programs, code, and code segments needed to realize the forms herein can be construed by one of ordinary skill in the art.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A method of providing connectivity navigation with a head unit in a navigation system, the method comprising the steps of:
   determining, by the head unit, a reception state of global positioning system (GPS) information;
   searching, by the head unit, for at least one device connected by wire or wirelessly;
   receiving, by the head unit, position sensor information from each of the searched devices;
   determining, by the head unit, reliability of the received position sensor information; and
   selecting, by the head unit, information of one of the searched devices having high reliability as received information based on the determined reliability,
   wherein the position sensor information includes availability, an actual position value and a measurement time, and
   wherein the determining of the reliability of the position sensor information includes the step of:
     checking, by the head unit, the availability of the received position sensor information;
     calculating, by the head unit, a weight of the position sensor information received from an available sensor; and
     comparing, by the head unit, the actual position value according to the GPS information with the received position sensor information to determine the reliability.

2. The method according to claim 1, further comprising the steps of:
   requesting periodically, by the head unit, available position sensor information available from a vehicle controller; and
   receiving, by the head unit, the position sensor information from the vehicle controller.

3. The method according to claim 1, wherein the searching for the at least one device connected by wire or wirelessly further includes the step of determining, by the head unit, whether connection with a mobile terminal is established through at least one of wired communication or short-range communication.

4. The method according to claim 3, wherein the receiving of the position sensor information from the searched devices includes the steps of:
 requesting, by the head unit, the position sensor information from the mobile terminal when connection with the mobile terminal is established by wire or wirelessly; and
 receiving, by the head unit, the position sensor information from the mobile terminal.

5. The method according to claim 3, wherein the receiving of the position sensor information from the searched devices includes the steps of:
 requesting, by the head unit, prestored position information from a telematics server; and
 receiving, by the head unit, the position information from the telematics server.

6. The method according to claim 1, wherein the selecting the information of one of the searched devices having high reliability based on the determined reliability includes the step of selecting, by the head unit, position sensor information of an available device in descending order in correspondence with a GPS reception state of at least one of a vehicle or a mobile terminal.

7. The method according to claim 1, wherein the method is executed by a computer-readable recording medium having recorded thereon a program.

8. A navigation system for a vehicle comprising:
 a head unit mounted inside the vehicle;
 a vehicle controller configured to transmit and receive data to/from the head unit through controller area network (CAN) communication;
 a mobile terminal configured to transmit and receive data to/from the head unit using at least one of wired communication or short-range communication; and
 a telematics server configured to transmit and receive data to/from at least one of the head unit or the mobile terminal through a wireless Internet network,
 wherein the head unit determines a reception state of global positioning system (GPS) information, searches for at least one device connected by wire or wirelessly, receives position sensor information from the searched devices, determines reliability of the position sensor information, and selects information of one of the searched devices having high reliability as received information based on the determined reliability,
 wherein:
 the position sensor information includes availability, an actual position value and a measurement time, and
 the head unit is configured to:
  compare the actual position value according to the GPS information with the received position sensor information to determine the reliability,
  check the availability of the received position sensor information, and
  calculate a weight of the position sensor information received from an available sensor.

9. The navigation system according to claim 8,
 wherein the head unit periodically requests available position sensor information from the vehicle controller; and
 the head unit receives the position sensor information from the vehicle controller.

10. The navigation system according to claim 8, wherein the head unit determines whether connection with the mobile terminal is established through at least one of wired communication or short-range communication.

11. The navigation system according to claim 10, wherein the head unit requests the position sensor information from the mobile terminal when connection with the mobile terminal is established by wire or wirelessly and receives the position sensor information from the mobile terminal.

12. The navigation system according to claim 10, wherein the head unit:
 requests prestored position information from the telematics server; and
 receives the position information from the telematics server.

13. The navigation system according to claim 8, wherein the head unit selects position sensor information of an available device in descending order in correspondence with a GPS reception state of at least one of a vehicle or a mobile terminal.

* * * * *